US010885347B1

(12) United States Patent
Tater et al.

(10) Patent No.: US 10,885,347 B1
(45) Date of Patent: Jan. 5, 2021

(54) OUT-OF-CONTEXT VIDEO DETECTION

(71) Applicant: International Business Machines Corporation, Armonk, NY (US)

(72) Inventors: Tarun Tater, Bangalore (IN); Anush Sankaran, Bangalore (IN); Srikanth Govindaraj Tamilselvam, Chennai (IN); Naveen Panwar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/574,980

(22) Filed: Sep. 18, 2019

(51) Int. Cl.
*G06K 9/00* (2006.01)
*G06F 16/48* (2019.01)
*G06F 16/483* (2019.01)
*G06F 16/783* (2019.01)

(52) U.S. Cl.
CPC ....... *G06K 9/00765* (2013.01); *G06F 16/483* (2019.01); *G06F 16/489* (2019.01); *G06F 16/784* (2019.01)

(58) Field of Classification Search
CPC . G06K 9/00765; G06F 16/483; G06F 16/489; G06F 16/784
USPC ...................... 386/240, 241; 704/9, 257, 246
See application file for complete search history.

(56) References Cited

U.S. PATENT DOCUMENTS

| 6,567,775 | B1 | 5/2003 | Maali et al. |
| 8,935,745 | B2 | 1/2015 | Brock et al. |
| 9,529,840 | B1 | 12/2016 | Granstrom et al. |
| 9,723,344 | B1 | 8/2017 | Granstrom et al. |
| 2003/0113002 | A1 | 6/2003 | Philomin et al. |

(Continued)

FOREIGN PATENT DOCUMENTS

| CN | 104602102 A | 5/2015 |
| WO | WO2019015646 A1 | 1/2019 |

OTHER PUBLICATIONS

Hou et al., "Towards Automatic Detection of Misinformation in Online Medical Videos" ICMI '19: 2019 International Conference on Multimodal InteractionOct. 2019 pp. 235-243. (Year: 2019).*

(Continued)

*Primary Examiner* — Thai Q Tran
*Assistant Examiner* — Stephen R Smith
(74) *Attorney, Agent, or Firm* — Ference & Associates LLC (57) ABSTRACT

One embodiment provides a method, comprising: identifying, using a processor, an individual in a video segment; ascertaining, from at least the video segment, a viewpoint expressed by the individual on a topic, wherein the viewpoint comprises at least one of: a stance of the individual and a sentiment of the individual toward the topic; identifying, using a processor, a superset video comprising the video segment, wherein the superset video is an originally published video; ascertaining, based at least in part on the superset video, an overarching viewpoint of the individual on the topic; determining whether an inconsistency exists between the viewpoint expressed by the individual in the video segment and the overarching viewpoint of the individual ascertained in the superset video; and alerting, responsive to determining that an inconsistency exists, a user that the video segment contains the inconsistency.

20 Claims, 3 Drawing Sheets

(56) References Cited

U.S. PATENT DOCUMENTS

| | | | |
|---|---|---|---|
| 2013/0158984 A1* | 6/2013 | Myslinski | G06F 16/951 |
| | | | 704/9 |
| 2018/0239832 A1* | 8/2018 | Galuten | G06Q 10/10 |
| 2019/0155900 A1* | 5/2019 | Ghotbi | G06N 20/00 |
| 2019/0163327 A1* | 5/2019 | Otero | G06F 16/908 |
| 2019/0179956 A1* | 6/2019 | Krasadakis | G06F 40/35 |
| 2019/0379628 A1* | 12/2019 | Wu | H04L 51/32 |
| 2020/0004882 A1* | 1/2020 | Kulkarni | G06F 16/9535 |
| 2020/0202071 A1* | 6/2020 | Ghulati | G06F 40/216 |

OTHER PUBLICATIONS

Pérez-Rosas et al., "Automatic Detection of Fake News" (2019) Proceedings of the 27th International Conference on Computational Linguistics. (pp. pp. 3391-3401). Association for Computational Linguistics: Santa Fe, New Mexico, USA. (Year: 2019).*

* cited by examiner

OUT-OF-CONTEXT VIDEO DETECTION

BACKGROUND

Individuals consume a wide array of media on their devices (e.g., laptop and/or personal computers, smart phones, tablets, etc.). News article, in particular, constitute a large proportion of the content that an individual may come across while browsing the Internet and/or social media. Generally, rather than being presented with the full article at the outset, an individual may see a truncated summary of the article, a headline that may comprise a quote and/or that may be accompanied by a relevant picture, a short video clip, and the like. Once the individual selects the relevant link, they may be transported to a page that contains the full story or video.

BRIEF SUMMARY

In summary, one aspect of the invention provides a method, comprising: identifying, using a processor, an individual in a video segment; ascertaining, from at least the video segment, a viewpoint expressed by the individual on a topic, wherein the viewpoint comprises at least one of: a stance of the individual and a sentiment of the individual toward the topic; identifying, using a processor, a superset video comprising the video segment, wherein the superset video is an originally published video; ascertaining, based at least in part on the superset video, an overarching viewpoint of the individual on the topic; determining whether an inconsistency exists between the viewpoint expressed by the individual in the video segment and the overarching viewpoint of the individual ascertained in the superset video; and alerting, responsive to determining that an inconsistency exists, a user that the video segment contains the inconsistency.

Another aspect of the invention provides an apparatus, comprising: at least one processor; and a computer readable storage medium having computer readable program code embodied therewith and executable by the at least one processor, the computer readable program code comprising: computer readable program code configured to identify an individual in a video segment; computer readable program code configured to ascertain, from at least the video segment, a viewpoint expressed by the individual on a topic, wherein the viewpoint comprises at least one of: a stance of the individual and a sentiment of the individual toward the topic; computer readable program code configured to identify a superset video comprising the video segment, wherein the superset video is an originally published video; computer readable program code configured to ascertain, based at least in part on the superset video, an overarching viewpoint of the individual on the topic; computer readable program code configured to determine whether an inconsistency exists between the viewpoint expressed by the individual in the video segment and the overarching viewpoint of the individual ascertained in the superset video; and computer readable program code configured to alert, responsive to determining that an inconsistency exists, a user that the video segment contains the inconsistency.

An additional aspect of the invention provides a computer program product, comprising: a computer readable storage medium having computer readable program code embodied therewith, the computer readable program code executable by a processor and comprising: computer readable program code configured to identify an individual in a video segment; computer readable program code configured to ascertain, from at least the video segment, a viewpoint expressed by the individual on a topic, wherein the viewpoint comprises at least one of: a stance of the individual and a sentiment of the individual toward the topic; computer readable program code configured to identify a superset video comprising the video segment, wherein the superset video is an originally published video; computer readable program code configured to ascertain, based at least in part on the superset video, an overarching viewpoint of the individual on the topic; computer readable program code configured to determine whether an inconsistency exists between the viewpoint expressed by the individual in the video segment and the overarching viewpoint of the individual ascertained in the superset video; and computer readable program code configured to alert, responsive to determining that an inconsistency exists, a user that the video segment contains the inconsistency.

A further aspect of the invention provides a method, comprising: receiving, at a social media platform, a request to upload a video; determining, based upon analysis of the video, an identity of at least one speaking individual in the video; ascertaining a viewpoint of the at least one speaking individual based on their speech; extracting audiovisual characteristics of the video; comparing the extracted audiovisual characteristics against other videos stored in an accessible database; identifying a match between the extracted audiovisual characteristics and at least one of the other videos, wherein the at least one of the other videos contains the at least one speaking individual; ascertaining an overarching viewpoint of the at least one speaking individual; determining whether an inconsistency exists between the viewpoint of the at least one speaking individual in the video and the overarching viewpoint of the at least one speaking individual in the at least one other video; and preventing the upload of the video to the social media platform responsive to determining that an inconsistency exists.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Advances in technology provide users access to more information than ever before. More particularly, users are no longer singularly reliant on conventional news outlets (e.g., cable news networks, daily newspapers, etc.) for updates associated with current and/or relevant events. Instead, many users turn to social media platforms (e.g., FACEBOOK, TWITTER, REDDIT, etc.) on which various entities and individuals may post videos and links to news stories of interest. FACEBOOK is a registered trademark of Facebook, Inc. in the United States and other countries. TWITTER is a registered trademark of Twitter, Inc. in the United States and other countries. REDDIT is a registered trademark of Reddit, Inc. in the United States and other countries.

A common issue associated with virtually all social media platforms is the presence of unchecked misinformation. More specifically, users may upload doctored media content (e.g., manually altered images, audio clips, video clips, news articles, etc.) that may contain false and/or inauthentic expressions. Other users, without first verifying the authenticity of the upload, may subsequently share the doctored media with their friends and others. Such a cycle may result in the rapid spread of misinformation all across the Internet, which may have negative repercussions for one or more individuals or entities.

Conventional techniques exist that are able to determine whether media content has been altered in some way. However, content may be still be inauthentic even when it is not tampered with. More specifically, individuals' statements may be taken out of context and presented in a way that does not accurately represent their views on a particular issue. This is often done in an effort to paint certain individuals in a negative light or to capture the attention of viewers so that they will click on a link to a video or a website, which financially benefits the poster.

As an example of the foregoing, a prominent economist may be interviewed and asked their opinion about the projected state of the economy over the course of the next year. The economist's reply may include an overall net positive annual outlook but may nevertheless also include some criticisms (e.g., the economist may state that he does not expect much growth to occur over the next few months, etc.). Subsequently, a video of the interview may be published that contains the caption "Prominent Economist Believes Economy Will Not Grow". Clearly, the caption does not align with the economist's underlying views expressed in the interview, however, it is certainly attention grabbing and will likely generate more video views. There are currently no methods and/or techniques that are able to identify whether certain statements are being presented out of context.

Accordingly, the systems and techniques as described herein provide a system and technique for determining whether a particular video clip comprises one or more out-of-context statements and, responsive to determining that it does, alerting a viewing user of this determination. The system may first identify an individual in a video clip, which may be a portion of a larger, subset video. The system may then ascertain a viewpoint on a topic expressed by the individual in the video clip and may also ascertain an overarching viewpoint of the individual associated with the larger, subset video. Additionally, available context data may also be utilized by the system to better identify the overarching viewpoint of the individual at the time the larger, subset video was published. The system may thereafter compare the viewpoint of the individual in the video segment against the overarching viewpoint of the individual in the larger, subset video. Responsive to determining that some inconsistency exists between the two viewpoints, the system may alert the user of the inconsistency (e.g., by flagging the video clip, etc.).

Such a system provides a technical improvement over current techniques for identifying the presence of misinformation in video clips. More particularly, the system may be able to alert viewers about potentially misleading content even when the content in-question has not been tampered with in some way. Through this process, the alerts may be provided to a user prior to the user actually clicking on a content link or watching a content video.

Figure 1:
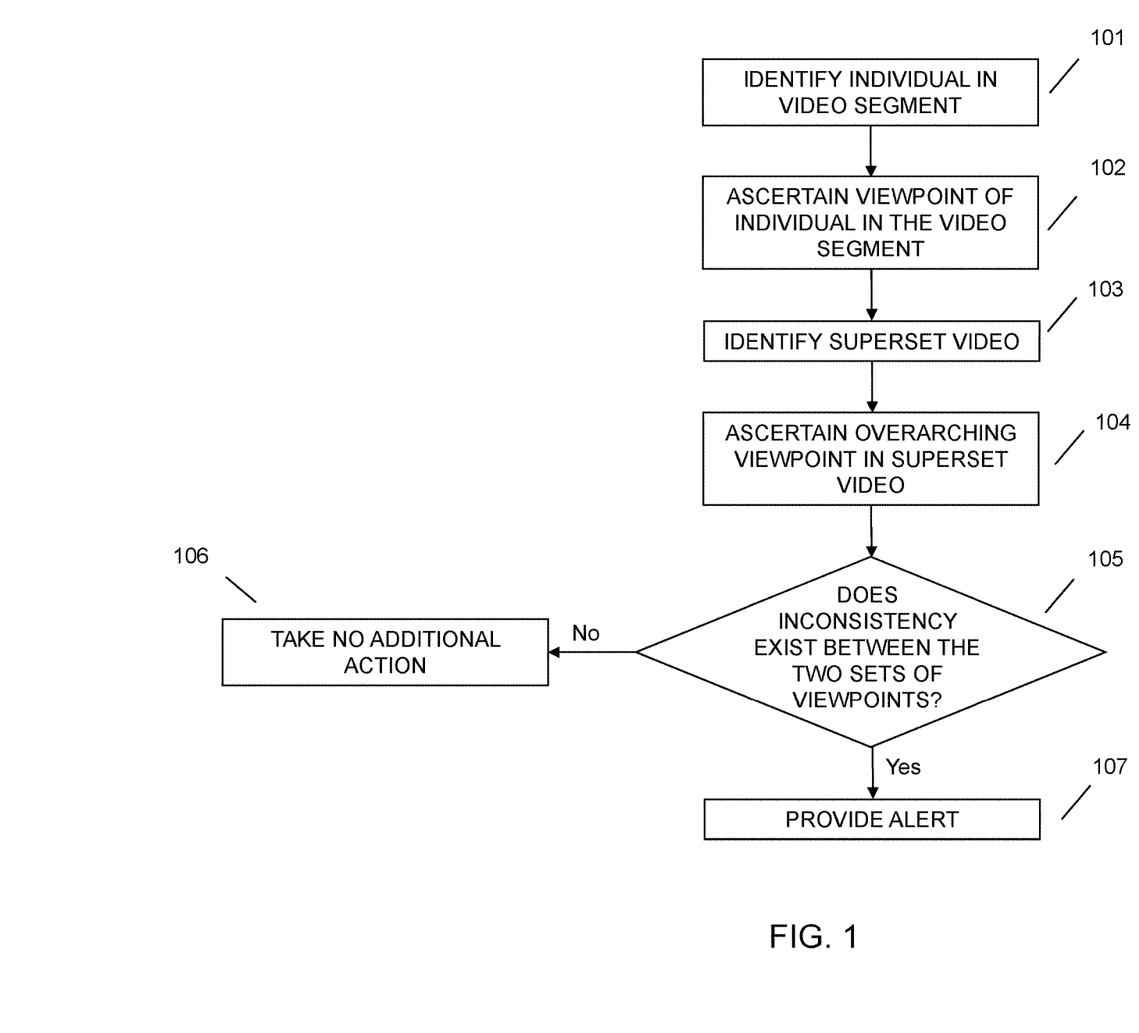
FIG. 1 illustrates a method of determining whether viewpoints in a video segment are presented out-of-context according to an embodiment.
Figure 2:
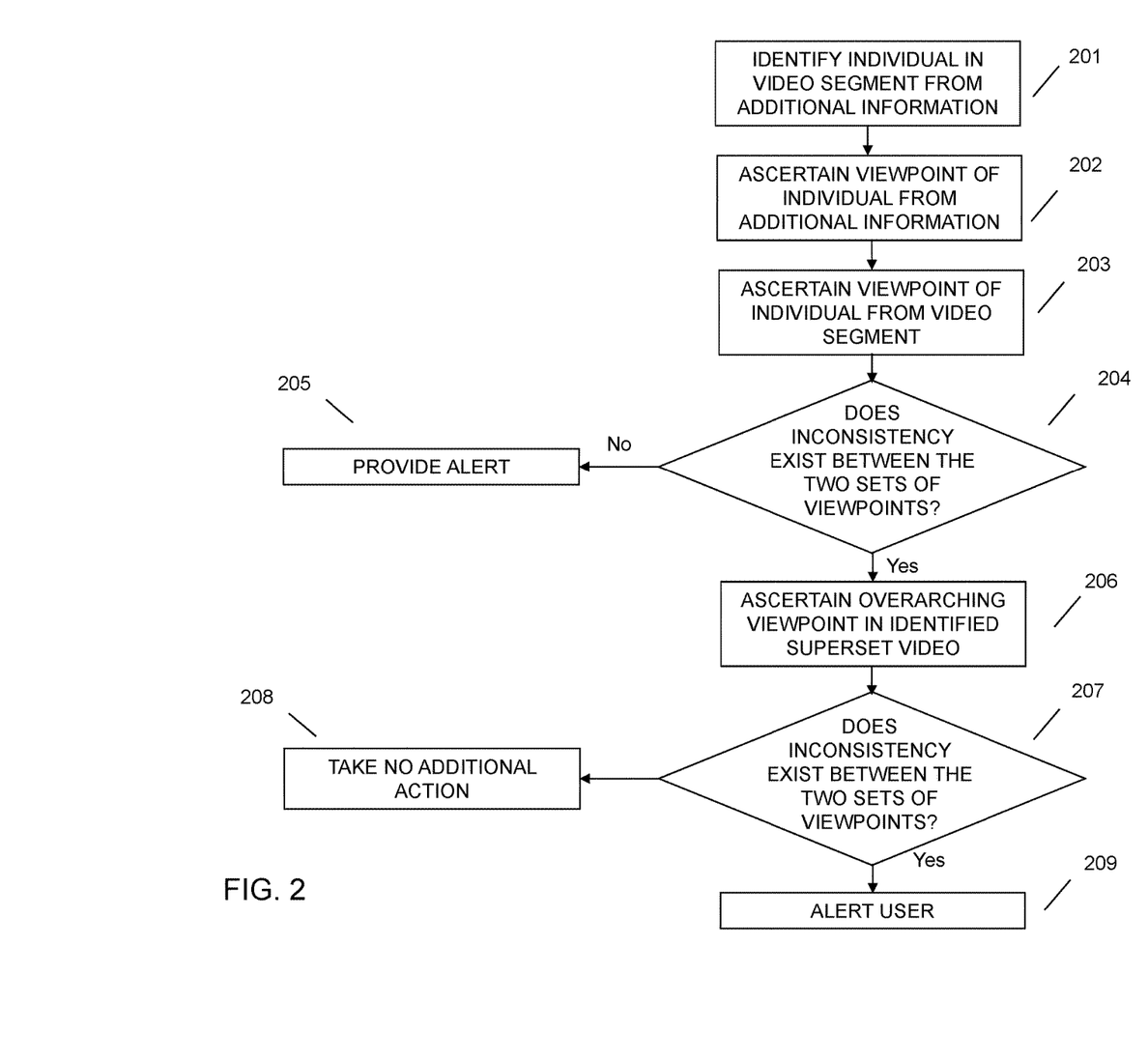
FIG. 2 illustrates another method of determining whether viewpoints in a video segment are presented out-of-context according to an embodiment.

FIG. 1 illustrates a system and method for determining whether misinformation exists in a video segment. At 101, the system may identify an individual in a video segment. In the context of this application, the video segment may be virtually any length and may be a portion that was extracted from a larger video (i.e., a superset video). The system may be capable of identifying a plurality of individuals present in the video segment. For example, the system may determine the identity of each individual that visually appears in the segment. Additionally or alternatively, the system may only determine the identity of those individuals who speak.

The identities of the individuals may be determined by utilizing one or more conventional identity determination techniques known in the art. For example, image analysis may be used to detect faces of individuals in the video segment and thereafter compare the detected faces to a database of faces associated with known individuals. Additionally or alternatively, the identities of the individuals may be also be inferred from any additional information presented with the video segment (e.g., metadata, a video segment caption, uploader comments, etc.).

At 102, the system may ascertain a viewpoint on a topic expressed by the individual in the video segment. The individual's viewpoint may include a stance of the individual toward the topic and/or a sentiment of the individual toward the topic. For example, an individual in the video segment may share their views regarding a political institution. The individual's stance may generally be in favor of the political institution, but their sentiment toward the institution's recent implementation of their policies may be negative. The ascertaining process may be conducted by utilizing one or more speech analysis techniques used in the art. For example, the system may first parse the words spoken by the relevant individual(s), analyze them, and thereafter identify a viewpoint based on the analysis. As another example, the system may transcribe all of the words spoken in the video, map the transcribed text to the relevant speaker, and thereafter analyze the transcribed text to identify the speaker's viewpoint. If the individual(s) express viewpoints on multiple topics, then the ascertaining process may be run multiple times until each of the viewpoints is ascertained.

In the situation where the upload only comprises the video segment, the system may, at 103, proceed to identify a superset video. The superset video may be a larger video that was published at an earlier time than the video segment and from which the video segment was obtained. The superset video may be identified by first analyzing the video segment to extract particular characteristics associated with it. For example, specific visual and audio features of the video segment may be extracted using one or more techniques known in the art (e.g., keyframes may be extracted from deep nets such as VGG19, ResNet 50, Inception Net, etc.; audio features may be extracted from techniques such as Mel-frequency-cepstral, Spectogram analysis, etc.). The extracted visual and audio features may thereafter be run against a video database (e.g., stored locally, stored remotely on another server or device, etc.) to determine the top 'n' most relevant superset videos. The 'n' most relevant superset videos may thereafter be scored for extracted audio and visual feature similarity, with the highest scored videos being considered to be the original superset video.

Once the superset video is identified, at 103, the system may then ascertain, at 104, an overarching viewpoint of the individual on the topic based at least in part on the comments presented by the individual in the superset video. The overarching viewpoint may be ascertained using the same or similar techniques described above with respect to step 102. Additionally or alternatively, available context data may also be used to ascertain or confirm the overarching viewpoint of the individual. More particularly, the system may obtain additional information (e.g., public comments, social media posts, etc.) about the individual's views at the time that the superset video was published. For example, an individual may have authored an article about a particular topic at Time A. The superset video, also published around Time A, may contain segments of the individual speaking about the topic. In such a situation, the system may extract information from the article to ascertain or confirm the individual's viewpoint regarding the topic. The timeframe around the publication of the superset video from which information may be pulled may be originally set by a manufacturer/programmer and thereafter adjusted by a user (e.g., the system may extract context information dated within 3 months before or after publication of the superset video, etc.).

At 105, the system may determine whether an inconsistency exists between the viewpoint expressed by the individual in the video segment and the overarching viewpoint expressed by the individual in the superset video. The determination may be conducted by comparing the two identified viewpoints and identifying similarities and differences between the two sets of viewpoints. The system may conclude that the viewpoints are consistent if the system identifies that a predetermined level of similarity exists between the two viewpoints (e.g., 80% similarity, 90% similarity, etc.).

Responsive to determining, at 105, that the two sets of viewpoints share a predetermined level of similarity, the system may conclude that the video segment is contextually consistent with the individual's views in the superset video and, at 106, take no additional action. Alternatively, the system may provide the uploader of the video segment or a viewer of the video segment with an audible or visual indication that the video segment is contextually consistent. Conversely, responsive to determining, at 105, that the two sets of viewpoints do not share a predetermined level of similarity, the system may conclude that the video segment is not contextually consistent with the individual's views expressed in the superset video and, at 107, alert an uploader of the video and/or a viewer of the video of the inconsistency.

The alert provided by the system may take one of many different forms and may be provided at a variety of different points of the video segment upload. For example, the alert may be a visual indicator (e.g., a red flag, a red exclamation point, etc.) that may be representative of an indication that the views expressed in the video segment are likely taken out-of-context. Additionally or alternatively, the alert may be a summary of the inconsistency and may identify the superset video from which the video segment was taken and/or describe the differences between the viewpoints expressed in the video segment and those expressed in the superset video.

The alert may be automatically provided to the uploader when they attempt to upload the video segment to a social media platform. Such an alert may inform the uploader that the video segment they are about to post likely comprises some inconsistencies and that they should inspect the contents of the video segment prior to uploading. Additionally or alternatively, the alert may be provided to a viewer of the video segment. For example, as a viewer is browsing through social media, any suspect video segments may be inherently flagged. Alternatively, alerts may only be provided to a viewer if they choose to actively initiate the foregoing process (e.g., by selecting a consistency determination button associated with the upload, etc.).

Depending on the availability of contact information, the alerts may be provided to the actual individual highlighted in the video segment. More particularly, as an example, if the system identifies that an uploaded video contains out-of-context viewpoints, the system may send a notification to the individual, or the individual's agent or representative, to inform them of the fact that an out-of-context video has been uploaded on the Internet.

In situations where the video segment is uploaded with additional information (e.g., a caption, uploader's comments or allegations, etc.), then the identity of the individuals may be inferred, at 201, from the additional information. The alleged viewpoint of the relevant individuals may then be deduced, at 202, from the additional information (e.g., using one or more word analysis techniques, etc.). At 203, the viewpoint of the individual as expressed in the video segment may be ascertained (as previously described with respect to step 102) and compared, at 204, to the alleged viewpoint to determine if there is an inconsistency. Responsive to determining, at 204, that an inconsistency exists, the system may, at 205, provide an alert. Conversely, responsive to determining, at 204, that an inconsistency does not exist, the system may, at 206, identify a superset video (as previously described with respect to step 103) and ascertain an overarching viewpoint expressed in the superset video (as previously described with respect to step 104). The system may thereafter determine, at 207, whether an inconsistency exists between the overarching viewpoint in the superset video and the viewpoint expressed by the individual in the video segment (as previously described with respect to step 105). Responsive to determining, at 207, that an inconsistency does not exist, the system may, at 208, take no additional action. Conversely, responsive to determining, at 207, that an inconsistency exists, the system may, at 209, provide an alert (as previously described with respect to step 107).

Thus, the described system and method provide a significant technical improvement to conventional misinformation identification techniques. More particularly, as opposed to conventional techniques that generally only identify when media content has been altered in some way (e.g., video or audio has been removed, included, edited, etc.), the described system can identify when uploaded videos are presented out of context. More particularly, the system can identify whether the views of an individual presented in a video segment actually correspond to the real views of the individual. Responsive to determining that an inconsistency exists between the two sets of views, the system may provide some sort of alert that informs the uploader or viewer of the inconsistency.

Figure 3:
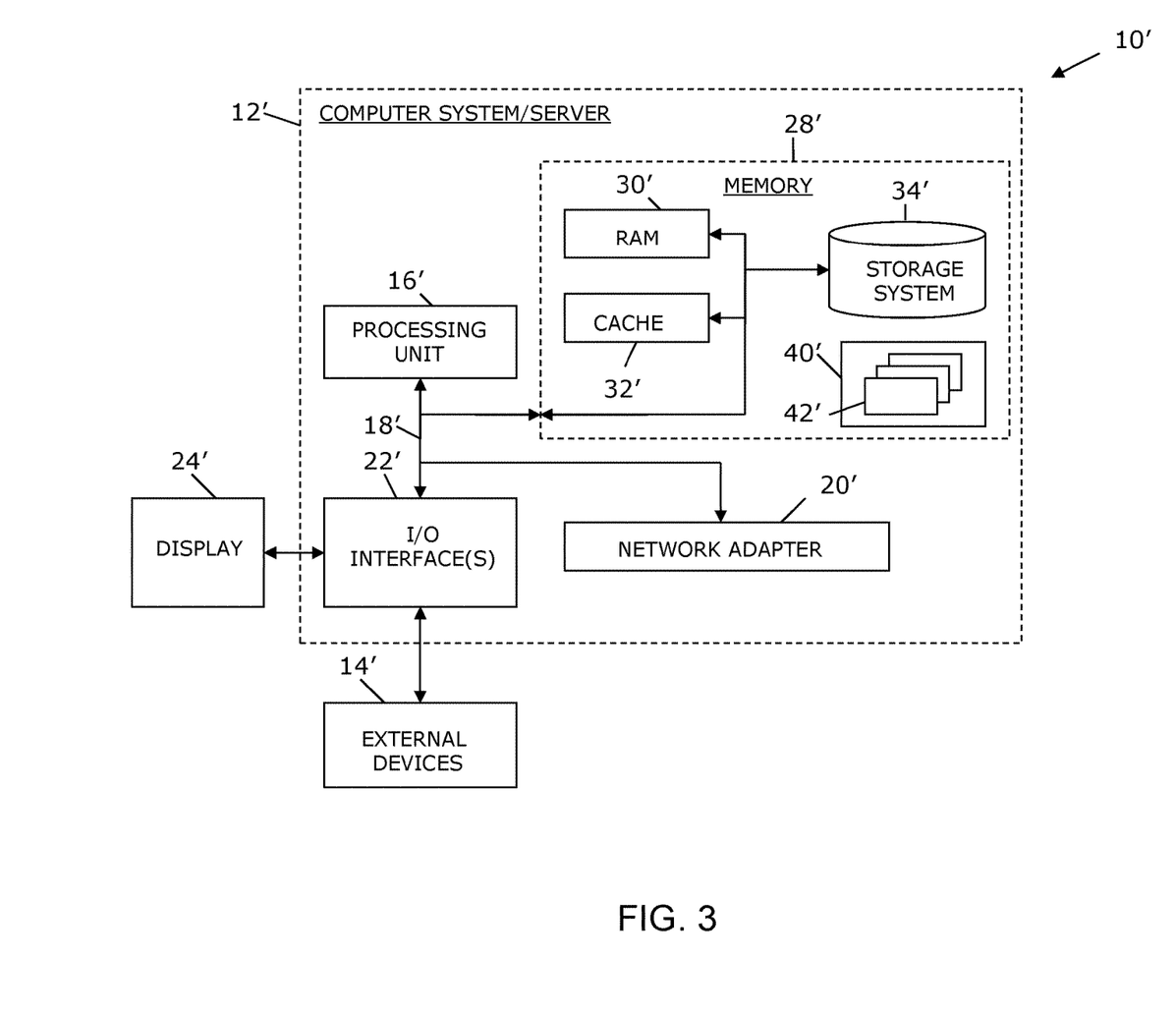
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    identifying, using a processor, an individual in a video segment;
    ascertaining, from at least the video segment, a viewpoint expressed by the individual on a topic, wherein the viewpoint comprises at least one of: a stance of the individual and a sentiment of the individual toward the topic;
    identifying, using a processor, a superset video comprising the video segment, wherein the superset video is an originally published video;
    ascertaining, based at least in part on the superset video, an overarching viewpoint of the individual on the topic;
    determining whether an inconsistency exists between the viewpoint expressed by the individual in the video segment and the overarching viewpoint of the individual ascertained in the superset video; and
    alerting, responsive to determining that an inconsistency exists, a user that the video segment contains the inconsistency.

2. The method of claim 1, wherein the identifying the individual comprises identifying using an image analysis technique.

3. The method of claim 1, wherein the identifying the superset video comprises:
    extracting audiovisual characteristics from the video segment;
    searching an accessible database for n-number of videos comprising the audiovisual characteristics;
    scoring the n-number of videos with respect to the audiovisual characteristics; and
    identifying the superset video from the n-number of videos by identifying at least one video from the n-number of videos having a predetermined level of similarity to the audiovisual characteristics.

4. The method of claim 1, wherein the ascertaining the overarching viewpoint comprises ascertaining by utilizing additional context data associated with a time frame corresponding to a publication date of the superset video.

5. The method of claim 4, wherein the time frame is adjustable by the user.

6. The method of claim 1, wherein the alerting comprises providing a visual indication of the inconsistency.

7. The method of claim 6, wherein the visual indication comprises a symbol positioned in proximity to the video segment.

8. The method of claim 6, wherein the visual indication comprises a description of the inconsistency.

9. The method of claim 1, further comprising:
    identifying additional information associated with the video segment;
    ascertaining an alleged viewpoint of the individual based on the additional information;
    comparing the alleged viewpoint to the viewpoint expressed by the individual in the video segment;
    determining whether an inconsistency exists between the alleged viewpoint and the viewpoint expressed by the individual in the video segment; and
    alerting, responsive to determining that an inconsistency exists between the alleged viewpoint and the viewpoint expressed by the individual in the video segment, the user that additional information contains an inconsistency;
    wherein the identifying the individual comprises identifying the individual using the additional information.

10. The method of claim 1, wherein the method is initiated responsive to uploading of the video segment to a social media platform.

11. An apparatus, comprising:
    at least one processor; and
    a computer readable storage medium having computer readable program code embodied therewith and executable by the at least one processor, the computer readable program code comprising:
    computer readable program code configured to identify an individual in a video segment;
    computer readable program code configured to ascertain, from at least the video segment, a viewpoint expressed by the individual on a topic, wherein the viewpoint comprises at least one of: a stance of the individual and a sentiment of the individual toward the topic;
    computer readable program code configured to identify a superset video comprising the video segment, wherein the superset video is an originally published video;
    computer readable program code configured to ascertain, based at least in part on the superset video, an overarching viewpoint of the individual on the topic;
    computer readable program code configured to determine whether an inconsistency exists between the viewpoint expressed by the individual in the video segment and the overarching viewpoint of the individual ascertained in the superset video; and
    computer readable program code configured to alert, responsive to determining that an inconsistency exists, a user that the video segment contains the inconsistency.

12. A computer program product, comprising:
    a non-transitory computer readable storage medium having computer readable program code embodied therewith, the computer readable program code executable by a processor and comprising:
    computer readable program code configured to identify an individual in a video segment;
    computer readable program code configured to ascertain, from at least the video segment, a viewpoint expressed by the individual on a topic, wherein the viewpoint comprises at least one of: a stance of the individual and a sentiment of the individual toward the topic;
    computer readable program code configured to identify a superset video comprising the video segment, wherein the superset video is an originally published video;
    computer readable program code configured to ascertain, based at least in part on the superset video, an overarching viewpoint of the individual on the topic;
    computer readable program code configured to determine whether an inconsistency exists between the viewpoint expressed by the individual in the video segment and the overarching viewpoint of the individual ascertained in the superset video; and
    computer readable program code configured to alert, responsive to determining that an inconsistency exists, a user that the video segment contains the inconsistency.

13. The computer program product of claim 12, wherein the identifying the individual comprises identifying using an image analysis technique.

14. The computer program product of claim 12, wherein the identifying the superset video comprises:
    extracting audiovisual characteristics from the video segment;
    searching an accessible database for n-number of videos comprising the audiovisual characteristics;

scoring the n-number of videos with respect to the audiovisual characteristics; and identifying the superset video from the n-number of videos by identifying at least one video from the n-number of video having a predetermined level of similarity to the audiovisual characteristics.

15. The computer program product of claim 12, wherein the ascertaining the overarching viewpoint comprises ascertaining by utilizing additional context data associated with a time frame corresponding to a publication date of the superset video.

16. The computer program product of claim 12, wherein the alerting comprises providing a visual indication of the inconsistency.

17. The computer program product of claim 16, wherein the visual indication comprises a symbol positioned in proximity to the video segment.

18. The computer program product of claim 16, wherein the visual indication comprises a description of the inconsistency.

19. The computer program product of claim 12, comprising:

identifying additional information associated with the video segment;

ascertaining an alleged viewpoint of the individual based on the additional information;

comparing the alleged viewpoint to the viewpoint expressed by the individual in the video segment;

determining whether an inconsistency exists between the alleged viewpoint and the viewpoint expressed by the individual in the video segment; and alerting, responsive to determining that an inconsistency exists between the alleged viewpoint and the viewpoint expressed by the individual in the video segment, the user that additional information contains an inconsistency;

wherein the identifying the individual comprises identifying the individual using the additional information.

20. A method, comprising:

receiving, at a social media platform, a request to upload a video;

determining, based upon analysis of the video, an identity of at least one speaking individual in the video;

ascertaining a viewpoint of the at least one speaking individual based on their speech;

extracting audiovisual characteristics of the video;

comparing the extracted audiovisual characteristics against other videos stored in an accessible database;

identifying a match between the extracted audiovisual characteristics and at least one of the other videos, wherein the at least one of the other videos contains the at least one speaking individual;

ascertaining an overarching viewpoint of the at least one speaking individual;

determining whether an inconsistency exists between the viewpoint of the at least one speaking individual in the video and the overarching viewpoint of the at least one speaking individual in the at least one other video; and preventing the upload of the video to the social media platform responsive to determining that an inconsistency exists.

* * * * *